(12) United States Patent
Sugiyama et al.

(10) Patent No.: US 10,138,978 B2
(45) Date of Patent: Nov. 27, 2018

(54) VEHICLE DAMPER DEVICE

(71) Applicants: Masataka Sugiyama, Toyota (JP); Hiroaki Kimura, Toyota (JP)

(72) Inventors: Masataka Sugiyama, Toyota (JP); Hiroaki Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 674 days.

(21) Appl. No.: 14/775,280

(22) PCT Filed: Mar. 22, 2013

(86) PCT No.: PCT/JP2013/058420
§ 371 (c)(1),
(2) Date: Sep. 11, 2015

(87) PCT Pub. No.: WO2014/147839
PCT Pub. Date: Sep. 25, 2014

(65) Prior Publication Data
US 2016/0047434 A1 Feb. 18, 2016

(51) Int. Cl.
*F16D 3/12* (2006.01)
*F16F 15/123* (2006.01)
*F16F 15/129* (2006.01)
*B60K 6/26* (2007.10)
(Continued)

(52) U.S. Cl.
CPC .......... *F16F 15/12353* (2013.01); *F16D 3/12* (2013.01); *F16F 15/1297* (2013.01);
(Continued)

(58) Field of Classification Search
CPC ... F16F 15/12353; F16F 15/1297; F16D 3/12; B60Y 2400/48
See application file for complete search history.

(56) References Cited

U.S. PATENT DOCUMENTS 4,946,420 A * 8/1990 Jackel ................... F16F 15/131
192/113.4
5,030,167 A * 7/1991 Jackel ................... F16F 15/131
464/24
(Continued)

FOREIGN PATENT DOCUMENTS

JP 2009292477 A 12/2009
JP 2010516558 A 5/2010
(Continued)

*Primary Examiner* — Matthieu F Setliff
(74) *Attorney, Agent, or Firm* — Oliff PLC (57) ABSTRACT

A vehicle damper device may include: a first plate coupled to a crankshaft of the engine; a second plate coupled via an elastic body to the first plate; an inertia body coupled to the second plate; a support member coupled to the crankshaft along with the first plate; a bearing inserted between the support member and the inertia body; a third plate coupled to the inertia body; a fourth plate coupled to an input shaft of the power transmission device; and a torque limiter mechanism disposed between the third plate and the fourth plate, the torque limiter mechanism being disposed at a position on a radially inner side than the elastic body and not axially overlapping with the elastic body, the elastic body being a coil spring disposed in an outer circumferential portion of the first or second plate, and the elastic body being an arc-shaped arc spring.

3 Claims, 3 Drawing Sheets

(51) Int. Cl.
*B60K 6/36* (2007.10)
*B60K 6/40* (2007.10)
*B60K 6/445* (2007.10)
*B60K 6/547* (2007.10)
*B60K 6/24* (2007.10)
*B60K 6/38* (2007.10)

(52) U.S. Cl.
CPC .............. *B60K 6/24* (2013.01); *B60K 6/26* (2013.01); *B60K 6/36* (2013.01); *B60K 6/40* (2013.01); *B60K 6/445* (2013.01); *B60K 6/547* (2013.01); *B60K 2006/381* (2013.01); *B60Y 2400/48* (2013.01); *F16F 2232/02* (2013.01); *Y02T 10/6239* (2013.01); *Y02T 10/6295* (2013.01)

(56) References Cited

U.S. PATENT DOCUMENTS

| | | | |
|---|---|---|---|
| 7,604,542 B2 * | 10/2009 | Bach | F16D 3/12 464/27 |
| 8,944,925 B2 * | 2/2015 | Sakai | F16F 15/134 464/67.1 |
| 9,856,925 B2 * | 1/2018 | Maier | F16D 13/38 |
| 2006/0247065 A1 * | 11/2006 | Bach | F16D 3/12 464/68.3 |
| 2009/0283344 A1 | 11/2009 | Arnold et al. | |
| 2009/0294239 A1 | 12/2009 | Nakagaito et al. | |
| 2011/0098120 A1 | 4/2011 | Nakagaito et al. | |
| 2011/0177906 A1 | 7/2011 | Misu et al. | |
| 2012/0302359 A1 | 11/2012 | Saeki et al. | |
| 2013/0244800 A1 | 9/2013 | Sakai et al. | |
| 2016/0230836 A1 * | 8/2016 | Maier | F16D 13/38 |
| 2018/0031045 A1 * | 2/2018 | Yamada | F16D 3/12 |

FOREIGN PATENT DOCUMENTS

| | | |
|---|---|---|
| JP | 2011094656 A | 5/2011 |
| JP | 2011183820 A | 9/2011 |
| JP | 2012127410 A | 7/2012 |
| JP | 2012247005 A | 12/2012 |
| KR | 2012-0039311 A | 4/2012 |
| WO | 2012/066680 A1 | 5/2012 |

* cited by examiner

VEHICLE DAMPER DEVICE

TECHNICAL FIELD

The present invention relates to a structure of a vehicle damper device.

BACKGROUND ART

A vehicle damper device (hereinafter, damper device) is well known that is disposed between an engine and an input shaft of a drive system to suppress (absorb) a fluctuating torque. A structure of the damper device integrally including a torque limiter device is also achieved. In FIG. 28 of Patent Document 1, a damper device (a torque fluctuation absorbing device 1) including a torque limiter device (a limiter portion 4a) is disclosed.

PRIOR ART DOCUMENT

Patent Documents

Patent Document 1: Japanese Laid-Open Patent Publication No. 2012-247005
Patent Document 2: Japanese Laid-Open Patent Publication No. 2009-292477

SUMMARY OF THE INVENTION

Problems to be Solved by the Invention

For example, a hybrid vehicle including an electric motor has a problem that since the electric motor is built in a drive unit, a drive system has a large inertia mass, resulting in large amplitude during resonance. Additionally, for example, if engine fuel is made lean to take a measure for improving fuel consumption, combustion becomes unstable, and a low order force such as a half-order force of rotation tends to increase besides a primary force of explosion, which is a conventionally dominant force of explosion. This causes torsional resonance, which conventionally occurs in a region lower than an engine normal rotation number, to occur even in a region around an engine normal rotation number, affecting NV and drivability. If a gear ratio of a transmission is made higher or weight of the drive system is reduced to take a measure for improving fuel consumption, vibration transfer characteristics of the drive system causing a booming noise and a gear rattle noise tend to deteriorate.

To solve these problems, it is conceivable that an adjustment is made by reducing spring stiffness of a damper device or increasing inertia of the damper device so as to make a resonance frequency region lower. However, because of restrictions on mounting of the damper device etc., it is difficult to adjust the spring stiffness and the inertia so as to have desired values of the spring stiffness and the inertia for the damper device. For example, if the damper device of Patent Document 1 is applied to a hybrid vehicle, a reduction of the resonance frequency region to a desired region has limitations because of small inertia. On the other hand, a structure having an input shaft disposed with an inertia body like a damper device depicted in FIG. 6 of Patent Document 2 makes inertia of a damper device larger and therefore at least enables lowering of the resonance frequency region. However, since the inertia body is provided and a load applied to an input shaft (a carrier shaft 42A) accordingly increases, the input shaft must be made larger, resulting in an increase in size of a device, and therefore, the damper device is not considered practical.

The present invention was conceived in view of the situations and it is therefore an object of the present invention to provide a practical vehicle damper device integrally including a torque limiter device and having high NV damping characteristics.

Means for Solving the Problem

To achieve the object, a first aspect of the invention provides a vehicle damper device (a) disposed on a power transmission path between an engine and a power transmission device, comprising: (b) a first plate coupled to a crankshaft of the engine; (c) a second plate coupled via an elastic body to the first plate; (d) an inertia body coupled to the second plate; (e) a support member coupled to the crankshaft along with the first plate; (f) a bearing inserted between the support member and the inertia body; (g) a third plate coupled to the inertia body; (h) a fourth plate coupled to an input shaft of the power transmission device; and (i) a torque limiter mechanism disposed between the third plate and the fourth plate, the vehicle damper device wherein (j) the torque limiter mechanism is disposed at a position on a radially inner side than the elastic body and not axially overlapping with the elastic body, (k) the elastic body is a coil spring disposed in an outer circumferential portion of the first or second plate, and (l) the elastic body is an arc-shaped arc spring.

Effects of the Invention

Consequently, since the inertia body is added between the elastic body and the torque limiter mechanism, the inertia on the side of the input shaft of the damper device increases. As a result, the damper device with high NV damping characteristics having the resonance frequency region lowered can be achieved. Although the load applied to the input shaft is made larger in exchange for increasing the inertia, the load can be received via the bearing by the crankshaft to reduce the load applied to the input shaft. This eliminates the necessity of increasing the size of the input shaft in association with the increase in the inertia, and, therefore, a practical damper device can be achieved. Further, the torque limiter mechanism is disposed at a position on a radially inner side than the elastic body and not axially overlapping with the elastic body. As a result, a nested structure is formed in which the torque limiter mechanism is received in the space formed on the inner circumferential side of the axially bulging elastic body so as to shorten the axial distance between the elastic body and the torque limiter mechanism, and to reduce the axial length of the damper device. Moreover, the elastic body is an arc-shaped arc spring. As a result, since the length of the elastic body becomes longer as compared to a linear coil spring and compression allowance amount (contraction allowance, deformation amount) of the spring can be ensured, the spring stiffness can be made lower than the linear coil spring.

In a second aspect of the invention, preferably, the torque limiter mechanism is disposed at a position on a radially inner side than the elastic body and not axially overlapping with the elastic body. As a result, a nested structure is formed in which the torque limiter mechanism is received in the space formed on the inner circumferential side of the axially bulging elastic body so as to shorten the axial distance between the elastic body and the torque limiter mechanism, and to reduce the axial length of the damper device.

In a third aspect of the invention, preferably, an electric motor is coupled in a power transmittable manner to the input shaft, and the torque limiter mechanism is disposed at a position on a radially inner side than a coil end of the electric motor and not axially overlapping with the coil end. As a result, a nested structure is formed in which the torque limiter mechanism is received in the space formed on the inner circumferential side of the coil end of the electric motor so as to shorten the axial length between the damper device and the electric motor.

In a fourth aspect of the invention, preferably, a second bearing is inserted between the fourth plate and the support member. As a result, the crankshaft can receive a load of the fourth plate via the second bearing. Therefore, the load applied to the input shaft is further reduced and, thus, the input shaft can be prevented from increasing in size.

In a fifth aspect of the invention, preferably, the elastic body is an arc-shaped arc spring. As a result, since the length of the elastic body becomes longer as compared to a linear coil spring and compression allowance amount (contraction allowance, deformation amount) of the spring can be ensured, the spring stiffness can be made lower than the linear coil spring.

MODES FOR CARRYING OUT THE INVENTION

Examples of the present invention will now be described in detail with reference to the drawings. In the following examples, the figures are simplified or deformed as needed and portions are not necessarily precisely depicted in terms of dimension ratio, shape, etc.

First Example

Figure 1:
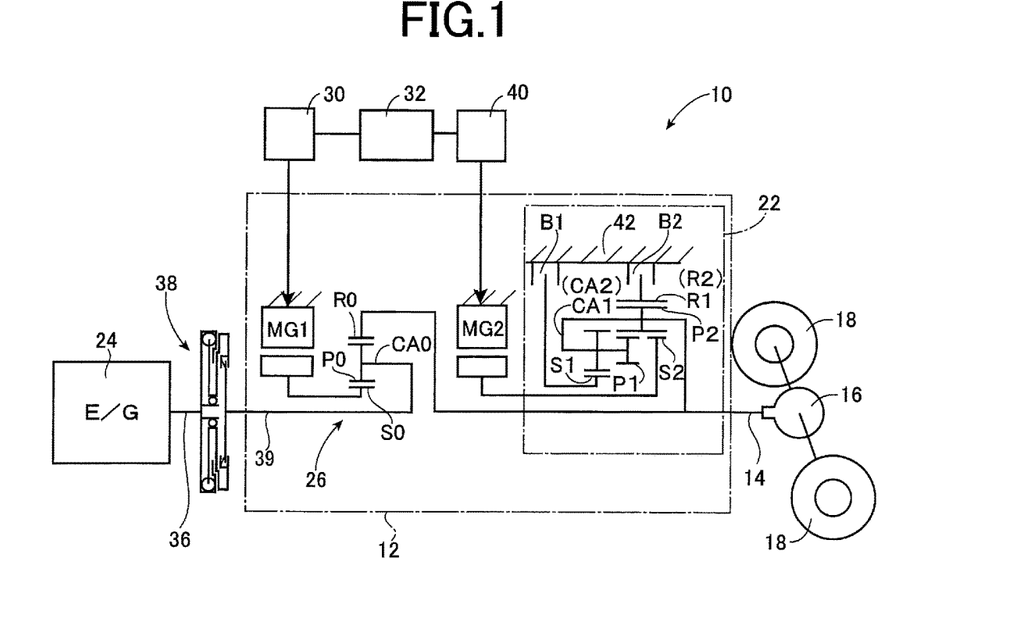
FIG. 1 is a general configuration diagram for explaining a vehicle drive device of a hybrid vehicle to which the present invention is applied.

FIG. 1 is a general configuration diagram for explaining a vehicle drive device 10 of a hybrid vehicle to which the present invention is applied. The vehicle drive device 10 includes an engine 24, a power transmission device 12, and a damper device 38 (a vehicle damper device of the present invention), which is described later, disposed between the engine 24 and the power transmission device 12. In FIG. 1, the vehicle drive device 10 transmits a torque of the engine 24 acting as a main drive source of the vehicle via the damper device 38 and a planetary gear device 26 to a wheel-side output shaft 14 and the torque is transmitted from the wheel-side output shaft 14 via a differential gear device 16 to a pair of left and right drive wheels 18. The vehicle drive device 10 is provided with a second electric motor MG2 capable of selectively providing power running control for outputting drive power for running and regenerative control for recovering energy and the second electric motor MG2 is coupled via an automatic transmission 22 to the wheel-side output shaft 14. Therefore, the output torque transmitted from the second electric motor MG2 to the wheel-side output shaft 14 is increased and decreased depending on a gear ratio γs (=rotation speed Nmg2 of the second electric motor MG2/rotation speed Nout of the wheel-side output shaft 14) set by the automatic transmission 22.

The automatic transmission 22 interposed in a power transmission path between the second electric motor MG2 and the drive wheels 18 is configured such that a plurality of gear stages having the gear ratio γs greater than "1" can be established and, at the time of power running when a torque is output from the second electric motor MG2, the torque can be increased and transmitted to the wheel-side output shaft and, therefore, the second electric motor MG2 is configured with a lower capacity or in a smaller size. As a result, for example, if the rotation speed Nout of the wheel-side output shaft is increased in association with a higher vehicle speed, the gear ratio γs is made smaller to reduce the rotation speed (hereinafter referred to as a second electric motor rotation speed) Nmg2 of the second electric motor MG2 so as to maintain operation efficiency of the second electric motor MG2 in a favorable state, or if the rotation speed Nout of the wheel-side output shaft is reduced, the gear ratio γs is made larger to increase the second electric motor rotation speed Nmg2.

The power transmission device 12 includes a first electric motor MG1 and the second electric motor MG2 and transmits the torque of the engine 24 to the drive wheels 18. The engine 24 is a known internal combustion engine combusting fuel to output power, such as a gasoline engine and a diesel engine, and is configured to have an operational state, such as a throttle valve opening degree and an intake air amount, a fuel supply amount, and an ignition timing, electrically controlled by an engine-control electronic control device (E-ECU) not depicted mainly made up of a microcomputer. The electronic control device is supplied with detection signals from an accelerator operation amount sensor AS detecting an operation amount of an accelerator pedal, a brake sensor BS for detecting the presence of operation of a brake pedal, etc.

The first electric motor MG1 (electric motor) is, for example, a synchronous electric motor, configured to selectively provide a function as an electric motor generating a drive torque and a function as an electric generator, and is connected via an inverter 30 to an electric storage device 32 such as a battery and a capacitor. The inverter 30 is controlled by a motor-generator-control electronic control device (MG-ECU), which is not depicted, mainly made up of a microcomputer, thereby adjusting or setting output torque or regenerative torque of the first electric motor MG1.

The planetary gear device 26 is a single pinion type planetary gear mechanism including a sun gear S0, a ring gear R0 disposed concentrically to the sun gear S0, and a carrier CA0 supporting a pinion gear P0 meshing with the sun gear S0 and the ring gear R0 in a rotatable and revolvable manner as three rotating elements to generate a known differential action. The planetary gear device 26 is disposed concentrically to the engine 24 and the automatic transmission 22. Since the planetary gear device 26 and the automatic transmission 22 are symmetrically configured relative to respective center lines, the lower halves thereof are not depicted in FIG. 1.

In this example, a crankshaft 36 of the engine 24 is coupled via the damper device 38 and an input shaft 39 of the power transmission device 12 to the carrier CA0 of the planetary gear device 26. On the other hand, the sun gear S0 is coupled to the first electric motor MG1, and the ring gear R0 is coupled to the wheel-side output shaft 14. The carrier CA0, the sun gear S0, and the ring gear R0 act as an input element, a reaction force element, and an output element, respectively. The damper device 38 corresponds to the vehicle damper device of the present invention and the input shaft 39 corresponds to an input shaft of a power transmission device of the present invention.

If a reaction torque from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When rotation speed of the ring gear R0, i.e., the rotation speed (output shaft rotation speed) Nout of the wheel-side output shaft 14 is constant, a rotation speed (engine rotation speed) Ne of the engine 24 can continuously (steplessly) be changed by changing a rotation speed Nmg1 of the first electric motor MG1 higher and lower. In other words, the first electric motor MG1 is coupled via the planetary gear device 26 to the input shaft 39 in a power transmittable manner.

The automatic transmission 22 of this example is made up of a set of Ravigneaux type planetary gear mechanisms. In other words, the automatic transmission 22 is provided with a first sun gear S1 and a second sun gear S2; a larger diameter portion of a stepped pinion P1 meshes with the first sun gear S1; a smaller diameter portion of the stepped pinion P1 meshes with a pinion P2; and the pinion P2 meshes with a ring gear R1 (R2) disposed concentrically to the sun gears S1, S2. The pinions P1, P2 are held by a common carrier CA1 (CA2) in a rotatable and revolvable manner. The second sun gear S2 meshes with the pinion P2.

The second electric motor MG2 (electric motor) is controlled via an inverter 40 by the motor-generator-control electronic control device (MG-ECU) to act as an electric motor or an electric generator and an assisting output torque or a regenerative torque is adjusted or set. The second sun gear S2 is coupled to the second electric motor MG2 and the carrier CA1 is coupled to the wheel-side output shaft 14. The first sun gear S1 and the ring gear R1 make up a mechanism corresponding to a double pinion type planetary gear device along with the pinions P1, P2, and the second sun gear S2 and the ring gear R1 make up a mechanism corresponding to a single pinion type planetary gear device along with the pinion P2.

The automatic transmission 22 is provided with a first brake B1 disposed between the first sun gear S1 and a housing 42 that is a non-rotating member for selectively fixing the first sun gear S1, and a second brake B2 disposed between the ring gear R1 and the housing 42 for selectively fixing the ring gear R1. The brakes B1, B2 are so-called friction engagement devices using a frictional force to generate a braking force and are implemented by employing multi-plate type engagement devices or band-type engagement devices. The brakes B1, B2 are configured such that torque capacities thereof are respectively continuously changed depending on engagement pressures generated by a hydraulic actuator for the brake B1 and a hydraulic actuator for the brake B2 such as hydraulic cylinders.

The automatic transmission 22 configured as described above is configured such that the second sun gear S2 acts as an input element, that the carrier CA1 acts as an output element, that a high-speed stage H is established with a gear ratio γsh greater than "1" when the first brake B1 is engaged, and that a low-speed stage L is established with a gear ratio γsl greater than the gear ratio γsh of the high-speed stage H when the second brake B2 is engaged instead of the first brake B1. In other words, the automatic transmission 22 is a two-speed transmission in which a shift between the gear stages H and L is performed based on a running state such as a vehicle speed V and a required drive power (or an accelerator operation amount). More specifically, shift stage regions are determined in advance as a map (shift diagram) and control is provided such that any of the shift stages is set depending on a detected drive state.

Figure 2:
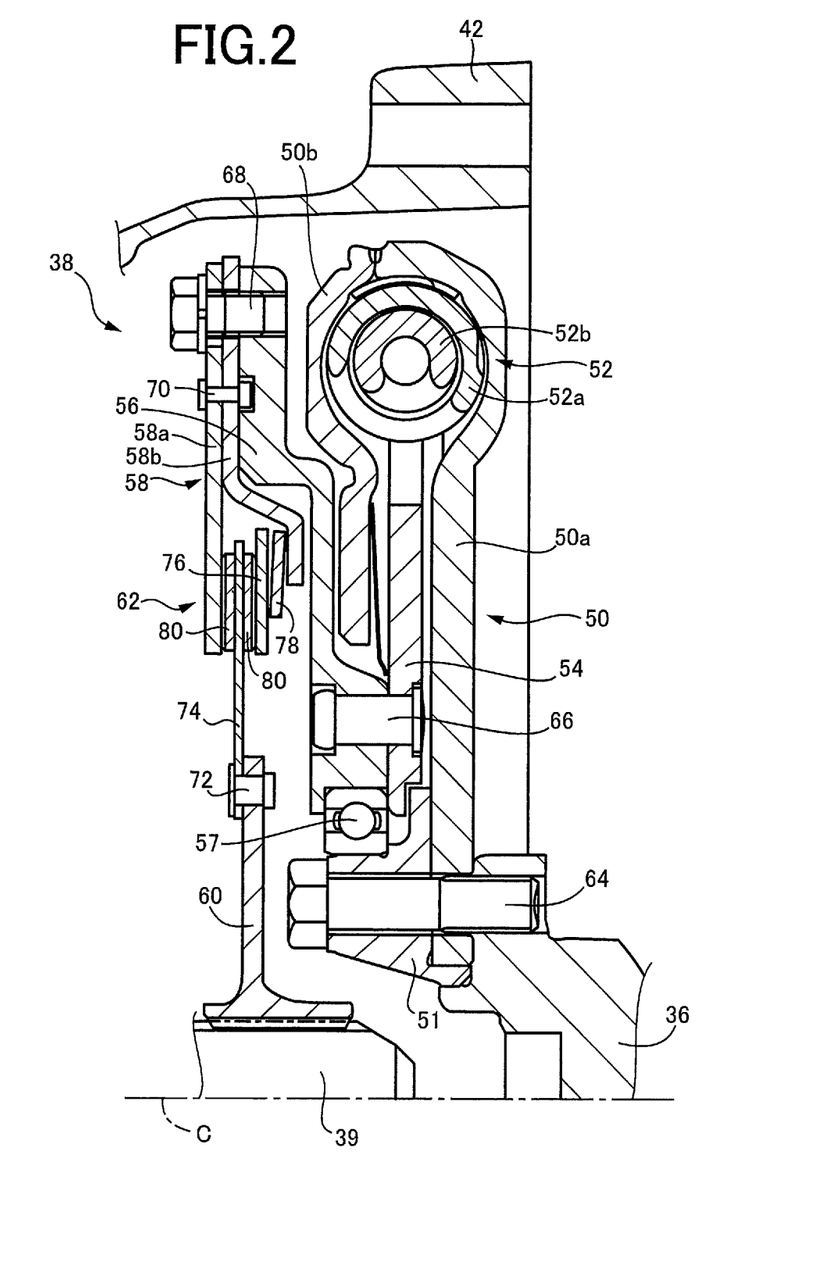
FIG. 2 is a cross-sectional view for explaining a configuration of a damper device of FIG. 1.

FIG. 2 is a cross-sectional view for explaining a configuration of the damper device 38 of FIG. 1. The damper device 38 is disposed on a power transmission path between the engine 24 and the power transmission device 12 around a rotation axial center C in the housing 42.

The damper device 38 includes a first disk plate 50 coupled to the crankshaft 36 of the engine 24, an annular support member 51 coupled to the crankshaft 36 along with the first disk plate 50, coil springs 52 housed to be covered by an outer circumferential portion of the first disk plate 50, a second disk plate 54 coupled in a power transmittable manner to the first disk plate 50 via the coil springs 52 disposed in the outer circumferential portion of the first disk plate 50, an inertia plate 56 coupled to an inner circumferential portion of the second disk plate 54, a ball bearing 57 inserted between the inertia plate 56 and the support member 51, a third disk plate 58 coupled to an outer circumferential portion of the inertia plate 56, a hub 60 having an inner circumferential portion coupled by spline-fitting to the input shaft 39, and a torque limiter mechanism 62 disposed between the third disk plate 58 and the hub 60. The first disk plate 50 corresponds to a first plate of the present invention; the second disk plate 54 corresponds to a second plate of the present invention; the inertia plate 56 corresponds to an inertia body of the present invention; the third disk plate 58 corresponds to a third plate of the present invention; the hub 60 corresponds to a fourth plate of the present invention; the coil springs 52 correspond to an elastic body of the present invention; and the ball bearing 57 corresponds to a bearing of the present invention.

The first disk plate 50 has an inner circumferential portion connected by a bolt 64 to the crankshaft 36 along with the support member 51 and is integrally rotated along with the engine 24 around the rotation axial center C. The first disk plate 50 is made up of a disk-shaped main plate portion 50a having an inner circumferential portion fastened to the crankshaft 36 and a disk-shaped sub-plate portion 50b having an outer circumferential portion connected by welding to an outer circumferential portion of the main plate portion 50a. The outer circumferential portion of the main plate portion 50a is formed into a bowl shape axially bulging toward the engine 24. The outer circumferential portion of the sub-plate portion 50b is formed into a bowl shape axially bulging toward the power transmission device 12. An outer circumferential end portion of the main plate portion 50a and an outer circumferential end portion of the sub-plate portion 50b are welded to each other to form a space having a substantially circular cross section for housing the coil springs 52 in the outer circumferential portion of the first disk plate 50. The first disk plate 50 has relatively large inertia mass and therefore has a function as an inertia body.

The coil springs 52 are housed in the space formed in the outer circumferential portion of the first disk plate 50 and transmit power while elastically deforming between the first disk plate 50 and the second disk plate 54. The coil spring 52 is made up of a first spring 52a and a second spring 52b housed (inserted) in the first spring 52a. The first spring 52a and the second spring 52b are made up of so-called arc springs formed into a circular arc shape (an arc shape) and two springs formed into a semicircular shape are used for each of the springs 52a, 52b in the damper device 38. The length of the second spring 52b housed in the first spring 52a is formed shorter than the first spring 52a and is compressed when a torsional angle becomes larger than a predetermined value. Since the coil springs 52 are made up of the arc springs, the length (free length) thereof becomes long and, therefore, the coil springs 52 with low spring stiffness can be used.

The second disk plate 54 has a circular plate shape and is disposed in a gap axially formed between the main plate portion 50a and the sub-plate portion 50b of the first disk plate 50. Two semicircular spaces are formed in an outer circumferential portion of the second disk plate 54 and the coil springs 52 are respectively housed in the two spaces. The inner circumferential portion of the second disk plate 54 is coupled by a rivet 66 to an inner circumferential portion of the inertia plate 56.

The inertia plate 56 has a disk shape with a predetermined thickness and is disposed on a power transmission path between the coil springs 52 and the torque limiter mechanism 62. The inner circumferential portion of the inertia plate 56 is connected by the rivet 66 to the second disk plate 54. An inner circumferential end portion of the inertia plate 56 is disposed at a position radially overlapping with the support member 51 and the ball bearing 57 is inserted between the inner circumferential end portion of the inertia plate 56 and the support member 51. The inertia plate 56 is bent on the radially slightly inner circumferential side than a bowl-shaped bulging part of the sub-plate portion 50b and the outer circumferential side of the inertia plate 56 is located axially closer to the power transmission device 12 as compared to the inner circumferential side. Specifically, the outer circumferential portion of the inertia plate 56 is axially shifted by an amount of axial bulging of the outer circumferential portion of the sub-plate portion 50b. Since the inertia plate 56 is bent, a space is formed at radially inside of the outer circumferential portion of the inertia plate 56. The inertia plate 56 corresponds to the inertia body of the present invention. As described above, the damper device 38 is a so-called flywheel damper with the first disk plate 50 and the inertia plate 56 each acting as an inertia body.

The outer circumferential portion of the inertia plate 56 is connected by a bolt 68 to an outer circumferential portion of the third disk plate 58. The third disk plate 58 is made up of two plates, which are a circular plate-shaped main plate portion 58a and a disk-shaped sub-plate portion 58b. Outer circumferential portions of the main plate portion 58a and the sub-plate portion 58b are both fastened by the bolt 68 to the outer circumferential portion of the inertia plate 56. Therefore, the third disk plate 58 is integrally rotated with the inertia plate 56 around the rotation axial center C. The main plate portion 58a and the sub-plate portion 58b are fastened also by a rivet 70 and an end portion of the rivet 70 closer to the inertia plate 56 is received in a cutout formed in the inertia plate 56. FIG. 2 depicts the bolt 68 and the rivet 70 formed at the same circumferential position; however, actually, the bolt 68 and the rivet 70 may be formed at circumferentially different positions and the rivet 70 may be disposed at the same radial position as the bolt 68. The sub-plate portion 58b is bent on the radially slightly inner side than the bent part of the inertia plate 56 so that an inner circumferential portion of the sub-plate portion 58b is housed in the space formed radially inside of the inertia plate by bending the inertia plate 56. As a result, a gap is formed between an inner circumferential portion of the main plate portion 58a and the inner circumferential portion of the sub-plate portion 58b. The torque limiter mechanism 62 is housed in this gap.

The torque limiter mechanism 62 is provided for preventing transmission of torque exceeding a preset limit torque Tlim. The torque limiter mechanism 62 includes a lining plate 74 having an inner circumferential portion fastened by a rivet 72 to an outer circumferential portion of the hub 60, a circular plate-shaped pressure plate 76, a cone-shaped disk spring 78 inserted between the pressure plate 76 and the sub-plate portion 58b, and a pair of friction materials 80 attached to the lining plate 74.

The lining plate 74 has a circular plate shape and has an inner circumferential portion coupled by the rivet 72 to the hub 60, thereby being rotated along with the hub 60 and the input shaft 39 around the rotation axial center C. The pair of the friction materials 80 is attached to the both axial sides of an outer circumferential portion of the lining plate 74 to enable sliding between the main plate portion 58a and the friction material 80 and between the pressure plate 76 and the friction material 80. The disk spring 78 is inserted in a preloaded state between the pressure plate 76 and the sub-plate portion 58b to press the pressure plate 76 toward the friction material 80. By adjusting a friction coefficient µ between the friction material 80 and the main plate portion 58a and between the friction material 80 and the pressure plate 76, a disc spring load of the disk spring 78, etc., the torque limiter mechanism 62 is configured such that when a torque exceeding the preset limit torque Tlim is input thereto, a slip occurs on a friction surface between the friction material 80 and the main plate portion 58a and between the friction material 80 and the pressure plate 76.

The torque limiter mechanism 62 is disposed at a position on the radially inner side than the coil springs 52 and not axially overlapping with the coil springs 52. Since the outer circumferential side of the sub-plate portion 50b of the first disk plate 50 is axially bulging toward the power transmission device 12 to form the space housing the coil springs 52, a space is formed on the inner circumferential side of the bulging part. The inertia plate 56 is bent such that the inner circumferential portion thereof is housed in the space, and a space is also formed on the inner circumferential side of this bent part. The torque limiter mechanism 62 and the sub-plate portion 58b are formed to axially bulge toward the engine 24 and the bulging part is housed in the space formed on the inner circumferential side of the bent part of the inertia plate 56. As described above, the bulge of the coil springs 52 and the sub-plate portion 50b as well as the bulge of the sub-plate portion 58b and the torque limiter mechanism 62 are arranged to form a nested structure in the radial direction. Therefore, the torque limiter mechanism 62 is disposed at a position on the radially inner side than the coil springs 52 and not axially overlapping with the coil springs 52 so that an axial distance between the coil springs 52 and the torque limiter mechanism 62 is made short.

The torque limiter mechanism 62 is located at a position on the outer circumferential side which is the vicinity of the coil springs 52 with regard to the radial direction. Since the bulge of the sub-plate portion 50b and the bulge of the sub-plate portion 58b and the torque limiter mechanism 62 radially overlap in the nested structure and the bolt 68 fixing the torque limiter mechanism 62 via the third disk plate 58 to the inertia plate 56 is disposed at a position on the outer circumferential side which is the same position as the coil springs 52 with regard to the radial direction, the torque limiter mechanism 62 can be disposed at a position on the outer circumferential side which is the vicinity of the coil springs 52 with regard to the radial direction. Since the torque limiter mechanism 62 is disposed on the outer circumferential side, a torque capacity of the torque limiter mechanism 62 can easily be ensured and the desired limit torque Tlim can be ensured without increasing the number of the friction materials 80, for example.

Since the main plate portion 58a and the sub-plate portion 58b of the third disk plate 58 are fastened by the rivet 70 in the damper device 38, the portions from the third disk plate 58 to the hub 60 are sub-assembled (modularized) as an independent member. Therefore, this sub-assembled component is assembled in a manufacturing line separated from an assembly line of the power transmission device 12. This sub-assembled component is positioned by a knock pin not depicted and then fastened by the bolt 68 to the inertia plate 56 without centering etc. A modularized component can be applied to a damper device etc. having another form.

Since the damper device 38 configured as described above has the inertia plate 56 disposed between the coil springs 52 and the torque limiter mechanism 62, inertia mass increases on the side of the input shaft 39 relative to the coil springs 52 of the damper device 38. The coil springs 52 having the arc spring structure are used in the damper device 38 of this example and, therefore, even a spring with low spring stiffness is applicable. Since the number of the coil springs 52 is two and lower than a conventional damper device, the spring stiffness can significantly be lowered in the damper device 38. By increasing the inertia mass and lowering the spring stiffness of the coil springs 52, a resonance frequency region of a drive system can significantly be reduced and, therefore, torsional resonance can be prevented from occurring in a normal rotation number region of the engine 24.

In exchange for providing the inertia plate 56 in the damper device 38, a load applied to the input shaft 39 during vehicle running is made larger. In this regard, since the ball bearing 57 is inserted between the inner circumferential end portion of the inertia plate 56 and the support member 51, the crankshaft 36 receives the load via the ball bearing 57 and the load applied to the input shaft 39 is reduced. The crankshaft 36 has extremely large stiffness and therefore generates no problem in terms of strength even if the load applied via the ball bearing 57 increases.

Since the torque limiter mechanism 62 is disposed at a position close to the input shaft 39 and the moment of inertia is significantly reduced between the torque limiter mechanism 62 and the input shaft 39, an overshoot torque generated during resonance is suppressed.

As described above, according to this example, the coil springs 52 having the arc spring structure are disposed on the outer circumferential side, the spring stiffness of the coil springs 52 can significantly be lowered. Since the inertia plate 56 is added between the coil springs 52 and the torque limiter mechanism 62, the inertia of the damper device 38 increases. This enables the lowering of the spring stiffness of the coil springs 52 and the increase in the inertia and, as a result, the damper device 38 with high NV damping characteristics capable of avoiding the torsional resonance can be achieved. Although the load applied to the input shaft 39 during running is made larger in exchange for increasing the inertia, the load can be received via the ball bearing 57 by the crankshaft 36 to prevent the input shaft 39 and the housing 42 from increasing in size in association with the increase in the inertia.

According to this example, the torque limiter mechanism 62 is disposed at a position on the radially inner side than the coil springs 52 and not axially overlapping with the coil springs 52. As a result, the bulge formed by the coil springs 52 and the bulge formed by the sub-plate portion 58b and the torque limiter mechanism 62 can be arranged to form a nested structure in the radial direction and, therefore, the axial distance between the coil springs 52 and the torque limiter mechanism 62 can be made shorter to reduce the axial length of the damper device 38.

According to this example, the coil springs 52 are made up of springs having the arc spring structure and, therefore, the spring stiffness of the coil springs 52 can significantly be lowered.

Another example of the present invention will be described. In the following description, the portions common with the example are denoted by the same reference numerals and will not be described.

Second Example

Figure 3:
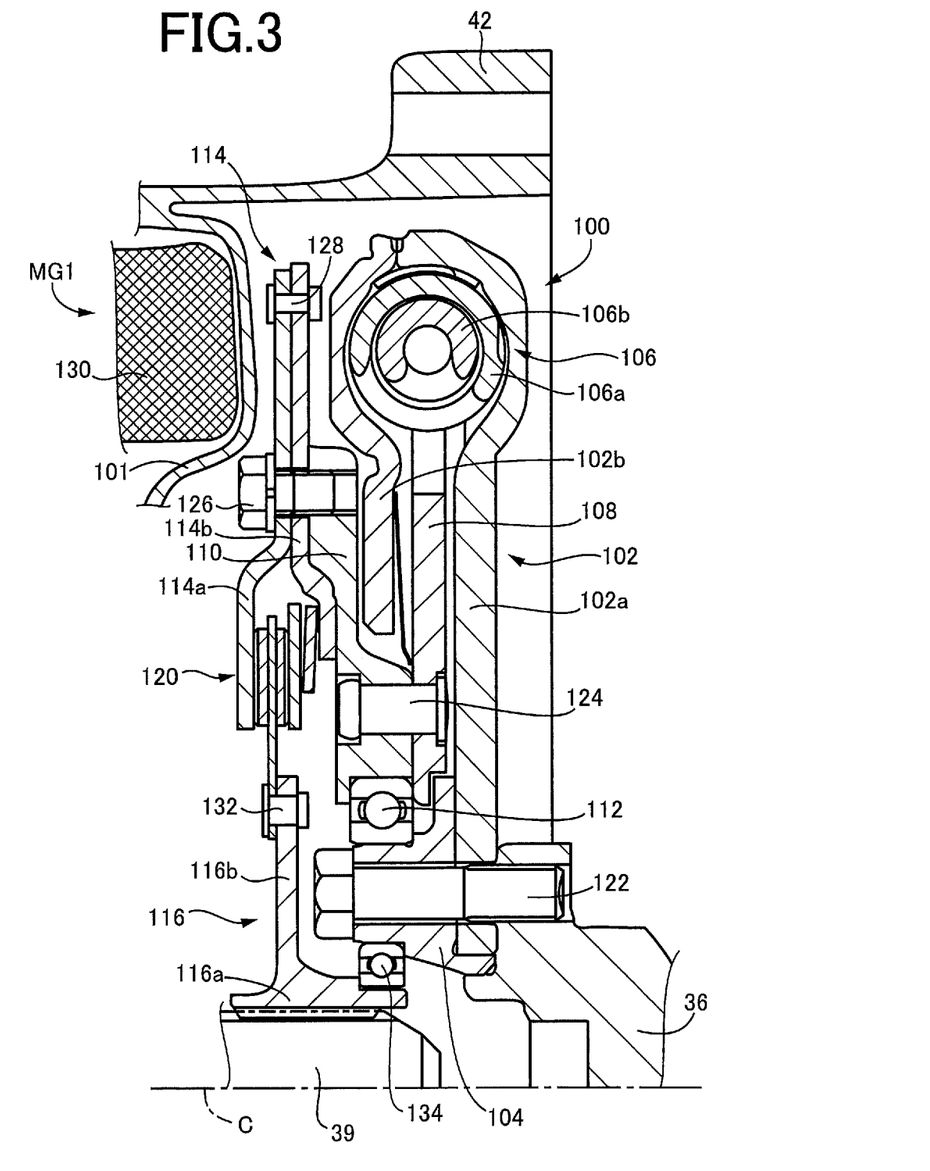
FIG. 3 is a cross-sectional view for explaining a configuration of a damper device that is another example of the present invention.

FIG. 3 is a cross-sectional view for explaining a configuration of a damper device 100 that is another example of the present invention. The damper device 100 is disposed at a position axially adjacent to the first electric motor MG1 across a partition wall 101 that is a portion of the housing 42. The damper device 100 includes a first disk plate 102 coupled to the crankshaft 36, an annular support member 104 coupled to the crankshaft 36 along with the first disk plate 102, coil springs 106 housed to be covered by an outer circumferential portion of the first disk plate 102, a second disk plate 108 coupled in a power transmittable manner via the coil springs 106 to the first disk plate 102, an inertia plate 110 coupled to an inner circumferential portion of the second disk plate 108, a ball bearing 112 inserted between the inertia plate 110 and the support member 104, a third disk plate 114 coupled to an outer circumferential portion of the inertia plate 110, a hub 116 having an inner circumferential portion coupled by spline-fitting to the input shaft 39 of the power transmission device 12, a torque limiter mechanism 120 disposed between the third disk plate 114 and the hub 116, and a ball bearing 134 inserted between the hub 116 and the support member 104. The first disk plate 102 corresponds to the first plate of the present invention; the second disk plate 108 corresponds to the second plate of the present invention; the third disk plate 114 corresponds to the third plate of the present invention; the hub 116 corresponds to the fourth plate of the present invention; the inertia plate 110 corresponds to the inertia body of the present invention; the coil springs 106 correspond to the elastic body of the present invention; the ball bearing 112 corresponds to the ball bearing of the present invention; and the ball bearing 134 corresponds to a second bearing of the present invention.

The first disk plate 102 has an inner circumferential portion connected by a bolt 122 to the crankshaft 36 along with the support member 104 and is integrally rotated along with the engine 24 around the rotation axial center C. The first disk plate 102 is made up of a disk-shaped main plate portion 102a having an inner circumferential portion fastened to the crankshaft 36 and a disk-shaped sub-plate portion 102b having an outer circumferential portion connected by welding to an outer circumferential portion of the main plate portion 102a. The outer circumferential portion of the main plate portion 102a is formed into a bowl shape axially bulging toward the engine 24. The outer circumferential portion of the sub-plate portion 102b is formed into a bowl shape axially bulging toward the power transmission device 12. An outer circumferential end portion of the main plate portion 102a and an outer circumferential end portion of the sub-plate portion 102b are welded to each other to form a space having a substantially circular cross section for housing the coil springs 106 in the outer circumferential portion of the first disk plate 102.

The coil springs 106 are housed in the space formed in the outer circumferential portion of the first disk plate 102 and transmit power while elastically deforming between the first disk plate 102 and the second disk plate 108. As is the case with the example described above, the coil springs 106 are made up of two first springs 106a having the arc spring structure and two second springs 106b having the arc spring structure and are achieved by using springs with low spring stiffness.

The second disk plate 108 has a circular plate shape and is disposed in a gap axially formed between the main plate portion 102a and the sub-plate portion 102b of the first disk plate 102. Two sets of two semicircular spaces are formed in an outer circumferential portion of the second disk plate 108 and the coil springs 106 are respectively housed in the spaces. The inner circumferential portion of the second disk plate 108 is coupled by a rivet 124 to an inner circumferential portion of the inertia plate 110.

The inertia plate 110 has a disk shape with a predetermined thickness and is disposed on a power transmission path between the coil springs 106 and the torque limiter mechanism 120. The inner circumferential portion of the inertia plate 110 is connected by the rivet 124 to the second disk plate 108. An inner circumferential end portion of the inertia plate 110 is disposed at a position radially overlapping with the support member 104 and the ball bearing 112 is inserted between the inner circumferential end portion of the inertia plate 110 and the support member 104. A portion in the radial direction of the inertia plate 110 is deformed such that the outer circumferential portion of the inertia plate 110 is located axially closer to the power transmission device 12 as compared to the inner circumferential portion of the inertia plate 110. A space is formed at radially outside of the inner circumferential portion of the inertia plate 110, and the inner circumferential portion of the sub-plate portion 102b is disposed in this space. Therefore, the inner circumferential portion of the inertia plate 110 is radially partially overlapped with the inner circumferential portion of the sub-plate portion 102b. The outer circumferential portion of the inertia plate 110 is housed in a space formed on the inner circumferential side than an axially bulging part of the sub-plate portion 102b. Therefore, the outer circumferential portion of the inertia plate 110 is radially partially overlapped with the axially bulging part of the sub-plate portion 102b.

The outer circumferential portion of the inertia plate 110 is connected by a bolt 126 to the third disk plate 114. The third disk plate 114 is made up of two plates, which are a disk-shaped main plate portion 114a and a disk-shaped sub-plate portion 114b. An outer circumferential portion of the main plate portion 114a and an outer circumferential portion of the sub-plate portion 114b are fastened by a rivet 128 and thereby integrally configured. The main plate portion 114a and the sub-plate portion 114b are fastened by the bolt 126 to the outer circumferential portion of the inertia plate 110 at a position on the inner circumferential side than a coil end 130 of the first electric motor MG1 and the coil springs 106 in the radial direction. An outer circumferential portion of the third disk plate 114 is radially extended to a position axially overlapping with the coil springs 106 and the coil end 130 of the first electric motor MG1 so that the inertia mass is ensured by an amount of radial extension of the third disk plate 114.

An inner circumferential portion of the main plate portion 114a is bent to axially bulge toward the first electric motor MG1. An inner circumferential portion of the sub-plate portion 114b is bent along a wall surface of the inertia plate 110 to axially bulge toward the engine 24. The torque limiter mechanism 120 is housed in a gap formed between the inner circumferential portion of the main plate portion 114a and the inner circumferential portion of the sub-plate portion 114b. The specific structure of the torque limiter mechanism 120 is substantially the same as the torque limiter mechanism 62 of the example described above and therefore will not be described.

Also in this example, the torque limiter mechanism 120 is disposed at a position on the radially inner side than the coil springs 106 and not axially overlapping with the coil springs 106. Additionally, the torque limiter mechanism 120 of this example is disposed at a position on the radially inner side than the coil end 130 of the first electric motor MG1 and not axially overlapping with the coil end 130.

As depicted in FIG. 3, the torque limiter mechanism 120 is disposed on the radially inner side than the coil springs 106 and the coil end 130. Therefore, the torque limiter mechanism 120 is disposed at a position not interfering with the bulge of the coil end 130 (and the partition wall 101) and the bulge of the sub-plate portion 102b (and the coil springs 106). Specifically, the torque limiter mechanism 120 is disposed in a space formed by the bulge of the coil end 130 (and the partition wall 101) on the inner circumferential side of the coil end 130 and a space formed by the bulge of the sub-plate portion 102b (and the coil springs 106) on the inner circumferential side of the sub-plate portion 102b. Moreover, the torque limiter mechanism 120 and the main plate portion 114a covering the torque limiter mechanism 120 bulge toward the coil end 130 relatively to the bulge of the coil end 130 (and the partition wall 101). Therefore, a nested structure is formed such that the bulge of the torque limiter mechanism 120 (and the main plate portion 114a) is received in a space at the inner circumferential side of the bulge of the coil end 130 (and the partition wall 101). On the other hand, the torque limiter mechanism 120 and the sub-plate portion 114b covering the torque limiter mechanism 120 bulge toward the sub-plate portion 102b relatively to the bulge of the sub-plate portion 102b (and the coil springs 106). Therefore, a nested structure is formed such that the bulge of the torque limiter mechanism 120 (and the sub-plate portion 114b) is received in a space at the inner circumferential side of the bulge of the sub-plate portion 102b (and the coil springs 106).

The lining plate of the torque limiter mechanism 120 and the hub 116 are fastened by a rivet 132. The hub 116 is made up of a cylindrical-shaped cylinder portion 116a and a flange portion 116b radially extending from the cylinder portion 116a. An inner circumferential portion of the cylinder portion 116a is spline-fitted to the input shaft 39 and therefore relatively non-rotatable to the input shaft 39. The ball bearing 134 is inserted between an outer circumferential end portion of the cylinder portion 116a axially closer to the engine 24 and the support member 104. An outer circumferential portion of the flange portion 116b is fastened by the rivet 132 to the lining plate of the torque limiter mechanism 120.

Since the damper device 100 configured as described above, too, has the inertia plate 110 disposed between the coil springs 106 and the torque limiter mechanism 102, inertia mass increases on the side of the input shaft 39 relative to the coil springs 106 of the damper device 100. Since the coil springs 106 having the arc spring structure are used in the damper device 100, too, the spring stiffness can significantly be lowered. Therefore, a resonance frequency region of a drive system can significantly be reduced, and torsional resonance can be prevented from occurring in a normal rotation number region of the engine.

In exchange for providing the inertia plate 110 in the damper device 100, the load applied to the input shaft 39 during vehicle running is made larger. In this regard, since the ball bearing 112 is inserted between the inner circumferential end portion of the inertia plate 110 and the support member 104, the crankshaft 36 receives the load via the ball bearing 112 and the load applied to the input shaft 39 is reduced. Since the ball bearing 134 is inserted also between the support member 104 and the hub 116 (the cylinder portion 116a) in this example, the crankshaft 36 receives via the ball bearing 134 the load applied to the hub 116. Therefore, the load applied to the input shaft 39 is reduced.

As described above, this example can provide the same effect as the example described above. In this example, the torque limiter mechanism 120 is disposed at a position on the inner side than the coil end 130 of the first electric motor MG1 and not axially overlapping with the coil end 130. As a result, the torque limiter mechanism 120 can be disposed in the space formed on the inner circumferential side of the coil end 130 of the first electric motor MG1 and a nested structure is formed such that the bulge of the torque limiter mechanism 120 is received in the space at the inner circumferential side of the bulge of the coil end 130 so as to shorten the axial length of the power transmission device 12.

Since the ball bearing 134 is inserted between the hub 116 and the support member 104, the crankshaft 36 can receive the load of the hub 116 via the ball bearing 134. Therefore, the load applied to the input shaft 39 is reduced and, thus, the input shaft 39 and the housing 42 can be prevented from increasing in size.

Although the examples of the present invention have been described in detail with reference to the drawings, the present invention is applied in other forms.

For example, although the examples described above have respective independent forms, the examples may be implemented in a combined manner as needed. For example, a bearing may be provided between the hub 60 and the support member 51 in the damper device 38.

Although the first disk plate 50 and the support member 51 are formed as separate bodies in the example, the first disk plate 50 and the support member 51 may integrally be formed.

Although the torque limiter mechanism 120 is disposed at a position on the radially inner side than the coil springs 106 and not axially overlapping with the coil springs 106 in the example, this structure may satisfy only the requirement that the torque limiter mechanism 120 is disposed at a position inside the coil end 130 of the first electric motor MG1 and not axially overlapping with the coil end 130.

Although the coil springs 52, 106 have the arc spring structure in the examples, the structure of the coil springs 52, 106 are not limited as such and conventional coil springs may be used.

Although the friction materials 80 are attached to the lining plate 74 in the examples, the friction materials 80 may be attached to the main plate portion 58a and the pressure plate 76. The friction materials 80 may be fixed to the lining plate 74 and the pressure plate 76 by a method other than attaching.

Although the ball bearings 57, 112, 134 are used in the examples, the bearings are not necessarily limited to ball bearings and, for example, bearings of other forms such as roller bearings may be used.

Although the two coil springs 52 are used in the example, the number of the coil springs is not necessarily limited to two and may be three or more.

Although the damper devices 38, 100 are applied to a hybrid vehicle including a differential mechanism made up of the planetary gear device 26 in the examples, the vehicle is not limited to the hybrid vehicle including a differential mechanism and may have a configuration in which an engine and an electric motor are coupled directly or via a clutch etc., without via a differential mechanism. The vehicle is not necessarily limited to a hybrid vehicle.

The above description is merely an embodiment and the present invention may be implemented in variously modified and improved forms based on the knowledge of those skilled in the art.

NOMENCLATURE OF ELEMENTS

12: power transmission device
24: engine
36: crankshaft
38, 100: damper device (vehicle damper device)
39: input shaft
50, 102: first disk plate (first plate)
51, 104: support member
52, 106: coil spring (elastic body)
54, 108: second disk plate (second plate)
56, 110: inertia plate (inertia body)
57, 112: ball bearing (bearing)
58, 114: third disk plate (third plate)
60, 116: hub (fourth plate)
62, 120: torque limiter mechanism
130: coil end
134: ball bearing (second bearing)
MG1: first electric motor (electric motor)

The invention claimed is:

1. A vehicle damper device disposed on a power transmission path between an engine and a power transmission device, comprising:
   a first plate coupled to a crankshaft of the engine;
   a second plate coupled via an elastic body to the first plate;
   an inertia body coupled to the second plate;
   a support member coupled to the crankshaft along with the first plate;
   a bearing inserted between the support member and the inertia body;
   a third plate coupled to the inertia body;
   a fourth plate coupled to an input shaft of the power transmission device; and
   a torque limiter mechanism disposed between the third plate and the fourth plate,
   the torque limiter mechanism being disposed at a position on a radially inner side than the elastic body and not axially overlapping with the elastic body,
   the elastic body being a coil spring disposed in an outer circumferential portion of the first or second plate, and
   the elastic body being an arc-shaped arc spring.

2. The vehicle damper device of claim 1, wherein
   an electric motor is coupled in a power transmittable manner to the input shaft, and wherein the torque limiter mechanism is disposed at a position on a radially inner side than a coil end of the electric motor and not axially overlapping with the coil end.

3. The vehicle damper device of claim 1, wherein a second bearing is inserted between the fourth plate and the support member.

\* \* \* \* \*